Figure 1:
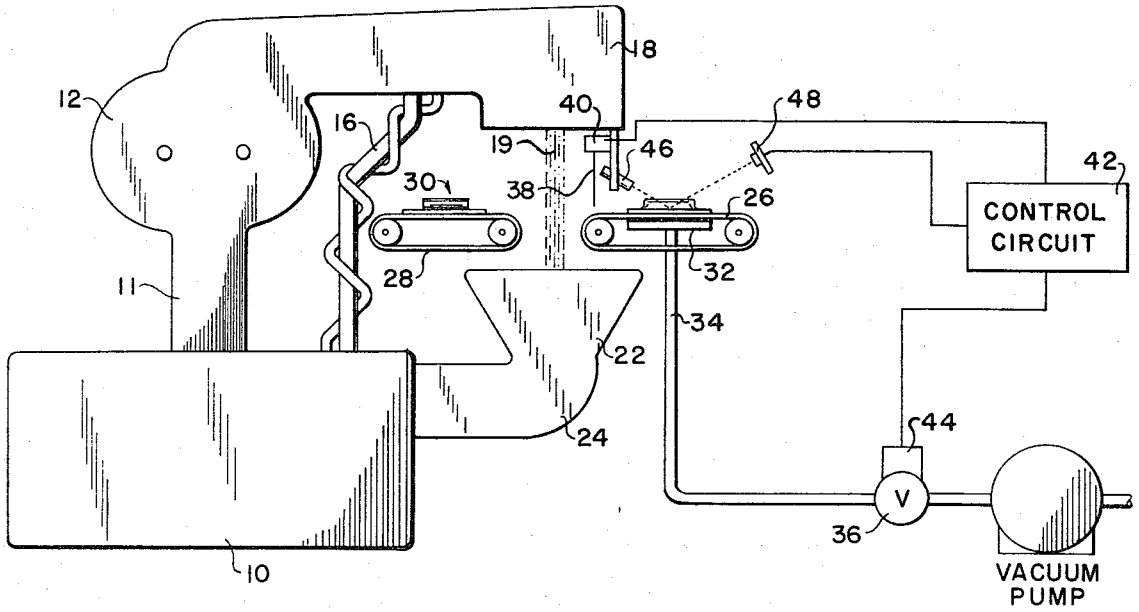
Figure 2:
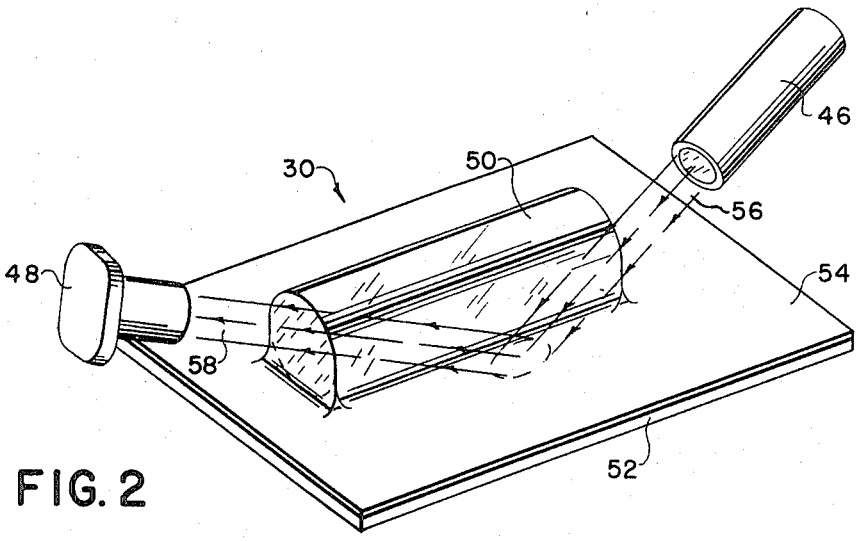
Figure 3:
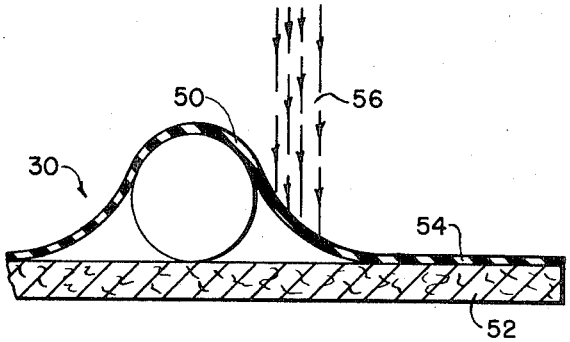
Figure 4:
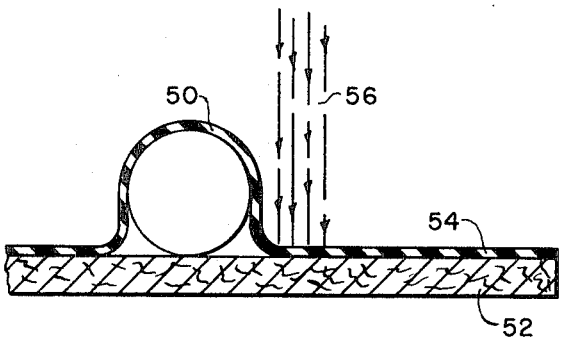
Figure 5:
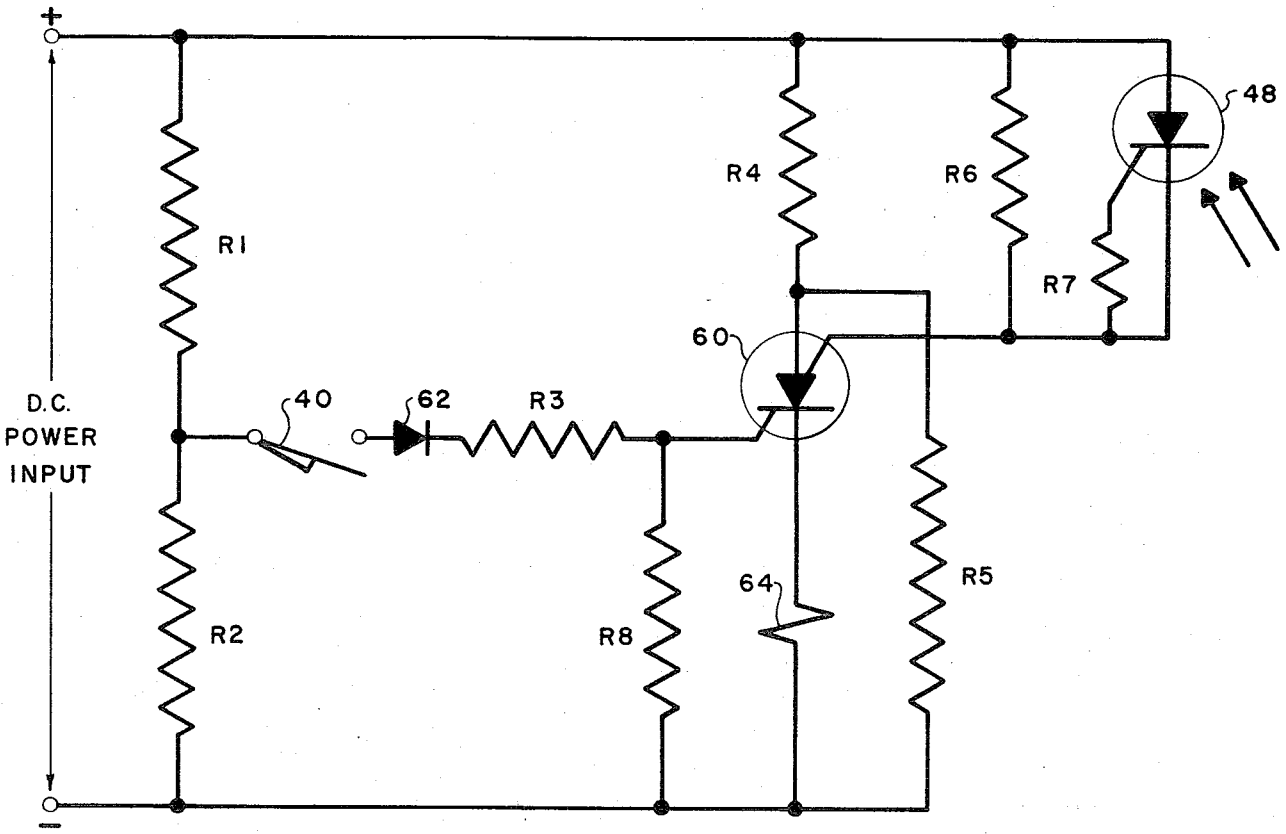

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 274

T904,019

METHOD AND APPARATUS FOR CONTROLLING DRAW DOWN OF PLASTIC COATING PROCESS

James E. Huffaker and Carl L. Terrell, both of P.O. Box 511, Kingsport, Tenn. 37662

Continuation of abandoned application Ser. No. 787,414, Dec. 27, 1968. This application Apr. 19, 1971, Ser. No. 135,508

Int. Cl. B29c *19/02;* C23c *13/08;* G01n *2/26*

U.S. Cl. 156—272

3 Sheets Drawing. 14 Pages Specification

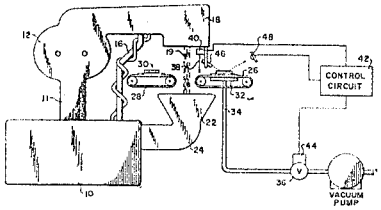

The drawdown of a plastic coating onto a substrate such as in a skin package is controlled by arranging a source of radiations and a radiation sensitive means so that when the coating is in contact with the substrate the radiations from the source will be reflected from the coating into the radiation sensitive device causing drawdown to be terminated. Thus, the amount of drawdown of a plastic coating onto a substrate and around an article is controlled. The preferred apparatus for accomplishing the control includes a solid-state, light sensitive means in circuit with a semi-conductor which controls the actuation of a relay regulating the operation of a pressure differential creating device.

METHOD AND APPARATUS FOR CONTROLLING DRAW DOWN OF PLASTIC COATING PROCESS

Original Filed Dec. 27, 1968 3 Sheets-Sheet 1

JAMES E. HUFFAKER
CARL L. TERRELL
INVENTORS

BY Charles L. Good
George P. Chandler
ATTORNEYS

JAMES E. HUFFAKER
CARL L. TERRELL
INVENTORS

BY Charles L. Good
George P. Chandler
ATTORNEYS

JAMES E. HUFFAKER
CARL L. TERRELL
INVENTORS
BY Charles L. Good
George P. Chandler
ATTORNEYS